UNITED STATES PATENT OFFICE 2,033,787

CARBOHYDRATE DERIVATIVES AND PROCESS OF MAKING THE SAME

George W. Rigby, Wilmington, Del., assignor to E. I. du Pont de Nemours & Company, Wilmington, Del., a corporation of Delaware No Drawing. Application January 9, 1934, Serial No. 705,895

13 Claims. (Cl. 260—100)

This invention relates to polymeric carbohydrate derivatives, more particularly to cellulose derivatives, and even more particularly to sulfuric acid derivatives of cellulose.

The preparation of sulfuric acid derivatives of cellulose has been the subject of several investigations but the various prior art methods of making these materials suffer from disadvantages among which are excessive degradation of the cellulose molecule, excessive difficulties of preparation, or impure end-products.

This invention has as an object the preparation of polymeric carbohydrate derivatives of improved quality as measured by the color of the product and the viscosity of aqueous solutions thereof. A further object is the preparation of derivatives of cellulose wherein the improved quality of the product is evidenced by the color thereof and the viscosity of aqueous solutions thereof. A still further object is the provision of a method whereby the difficulties of manipulation inherent in other methods of preparing sulfuric acid derivatives of polymeric carbohydrates such as cellulose are overcome. A still further object consists in the new and useful products preparable by this process insofar as they are different from prior art materials. Other objects will appear hereinafter.

These objects are accomplished by the following invention wherein a material having a polymeric carbohydrate nucleus such as a cellulosic nucleus and containing esterifiable hydroxyls is reacted with a sulfonating agent containing the radical

in the presence of a tertiary amine and an inert diluent.

In the process of the present invention chlorosulfonic acid or other sulfonating agent may be mixed with an inert diluent such as carbon disulfide and then mixed with a tertiary amine such as pyridine in solution, e. g. in toluene. A desirable process of mixing is that wherein the two streams of liquid unite while descending through a cool tube. To the solution of chlorosulfonic acid, pyridine, and diluent obtained, for example, as above, the polymeric carbohydrate, e. g. cellulose, is added and the mixture agitated with heating until the desired properties are obtained. The product is then isolated, for example by filtering from the diluent and may be extracted with denatured alcohol or other non-solvents for the carbohydrate sulfuric acid derivative. The process of the invention is illustrated by the following examples which are not to be construed in any way as limitative.

Example 1

Three hundred sixty-five parts of chlorosulfonic acid are gradually mixed with a stream of 253 parts of pyridine containing 145 parts of toluene, descending through a cooled tube. This mixture contained in a suitable vessel provided with a stirrer is heated to 90° C. and 162 parts of dry cotton linters pulp are added with stirring. Heating and stirring are continued for three hours. During this time the cellulose gradually swells and becomes a gelatinous mass which finally disintegrates but never dissolves. At the end of this time the liquid is decanted off and the solid washed with three changes of denatured alcohol. Final purification is effected by extracting the solid with denatured alcohol until free of chloride. The derivative may be dried at 70° C. The product so obtained is pure white and completely soluble in water to form a clear viscous solution.

The product obtained in the above example differs from that obtained according to the process of Gebauer-Fuelnegg U. S. Patent 1,734,291, being free from tarry by-products. It also differs in that it occurs as a viscous gel beneath a clear solution of the diluent and excess reagents, the gel being fibrous or not, depending upon the time of heating and also upon the diluent. The product of the Gebauer-Fuelnegg patent is soluble in the reaction mixture of that patent and is black and full of tarry by-products. The viscosity of the product as above prepared is likewise very much superior to that prepared by the Gebauer-Fuelnegg process. The time of mixing the reagents is also favorably shorter in the present process being less than twenty minutes in the production of ½ mol. batches of cellulose sulfuric acid whereas the Gebauer-Fuelnegg process requires about two hours for the same size batch.

Example 2

To 1920 parts of pyridine in 1060 parts of nitrobenzene are added slowly 580 parts of ethyl chlorosulfonate. To this is added 162 parts of cellulose and the mixture heated at 106° C. for 6 hours. The cellulose gradually swells and soon becomes gelatinous. After decanting off the nitrobenzene the solid is washed, first with benzene, then with denaturated alcohol until halogen free. The product is similar in properties to cellulose sulfuric acid with a similar degree of substitution (about 2.8 ethyl sulfonate groups per $C_6$ unit of the cellulose). The product is colorless and is soluble in water to give viscous solutions similar to cellulose sulfuric acid. It is likewise soluble in methanol and to some extent chloroform, but insoluble in denatured alcohol dioxane and similar organic solvents.

*Example 3*

To 438 parts of pyridine and 240 parts of dioxane are added 82 parts by volume of 100% sulfuric acid. To this are added 45 parts of cotton linters and the mixture heated at 70° C. for 6 hours. After washing with denatured alcohol until acid free, the product is found to consist of partially sulfonated cellulose suitable for use in preparing derivatives. The product is fibrous in character and completely colorless. It contains about ½ mol. of sulfuric acid per $C_6$ unit of the cellulose and is only partially soluble in water and dilute alkali.

*Example 4*

One hundred sixty-two parts of cellulose are added to 1760 parts of dioxane, 970 parts of pyridine, 360 parts by volume of acetic anhydride and 213 parts by volume of 100% sulfuric acid. The mixture is then heated to 110° C. for three hours with continuous stirring. The liquid is decanted off and the solid cellulose sulfuric acid dissolved in water. The clear solution is then poured into an excess of potassium hydroxide solution. The solid is filtered off, washed until neutral to phenolphthalein and dried at 100° C. The potassium salt of cellulose sulfuric acid so obtained analyzed 17.9% sulfur. $C_6H_7O_2(OH).3(SO_4K)2.7$ requires 17.95% sulfur.

As starting material any of the ordinary varieties of cellulose may be used including wood pulp, cotton linters, hydro- or oxy-cellulose, and partially substituted cellulose derivatives such as low substituted ethyl, methyl, or benzyl cellulose or cellulose acetate, formate, propionate, etc. Starch, inulin, mannan, xylan, chitin and other polymeric carbohydrates or polymeric carbohydrate derivatives may be used in place of cellulose.

Instead of pyridine other tertiary amines such as the picolines, lutidines, collodines, conyrine, diethyl aniline, dimethyl aniline, diethyl-p-toluidine, tri-n-butylamine quinoline or the like may be used. In general, pyridine type tertiary amines are prtferred because of the greater efficiency of their operation.

The temperature of the reaction may be varied from room temperature to 130° C. although temperatures from 75 to 90° C. are preferred. The time of reaction varies with the temperature, the diluent, the desired degree of esterification and with the desired viscosity of the product. Thus, for example, working at 100° C., the time of reaction is very much shorter than in a reaction carried out at 50° C. When toluene is used as a diluent the time of reaction is shorter than when acetone is used as a diluent. For a completely esterified product the time of reaction must be more extended than for an only partially esterified product. As the time of reaction is extended the viscosity of resulting products becomes lower.

The product may be completely soluble in water or only slightly swollen depending upon the completeness with which the esterification has been carried out and depending upon the proportions of reagents used. Cellulose trisulfate is water soluble while a cellulose sulfuric acid containing about 3% of sulfate groups is insoluble in water. As the proportion of reactive ingredient is increased the degree of esterification is increased under the same conditions of reaction time, temperature, etc. The water solubility of the product increases, therefore, as the proportion of reactive ingredient is increased.

The rate of reaction may be controlled somewhat by the use of a catalyst, thus pyridine hydrochloride or hydrobromide or picoline, lutidine, collidine, or conyrine hydrochloride or other tertiary amine hydrochloride or hydrobromide, ethylpyridinium chloride, benzylpyridinium chloride or other quaternary amine hydrochloride will serve as catalysts. The rate of reaction may also be controlled by pretreatment of the cellulose used. Thus, low substituted cellulose derivatives such as methyl, ethyl, or benzyl cellulose, glycol cellulose, and cellulose glycollic acid, esterify much more rapidly than cotton linters pulp.

Diluents employed may include two general types. The first type includes carbon disulfide, carbon tetrachloride, hexachloroethane, tetrachloroethane, and chloroform, which are substantially inert toward chlorosulfonic acid, and which serve to modify the sulfonating action of chlorosulfonic acid on pyridine. The second class of diluents, examples of which are given in the table below, and which are reactive within themselves toward chlorosulfonic acid, serve to dilute the pyridine or other tertiary amine and to dissipate the heat of mixing. Those diluents which are good solvents for pyridine hydrochloride, or other tertiary amine hydrochloride or quaternary amine halide occurring in the reaction are preferably used. The following table serves to illustrate the effect of different diluents on the reaction.

TABLE I

*Effect of diluents on the preparation of cellulose sulfuric acid from chloro-sulfonic acid and pyridine*

| No. | Diluent | Relative efficiency based on rate of esterification |
|---|---|---|
| 1 | Chlorobenzene | 100 |
| 2 | Benzene | 100 |
| 3 | Toluene | 95 |
| 4 | Dioxane | 95 |
| 5 | Di-benzyl-ether | 93 |
| 6 | Di-n-butyl ether | 92 |
| 7 | Acetone | 92 |
| 8 | Di-ethyl phthalate | 91 |
| 9 | Ethylene glycol di-acetate | 87 |
| 10 | Amyl acetate | 87 |
| 11 | Petroleum ether | 75 |
| 12 | Ethoxyethyl acetate | 75 |

In addition to the above group of solvents one other, nitrobenzene, should be named. This solvent is fully as good as chlorobenzene and benzene as regards rate of esterification and in addition is unique and especially desirable because it is a very good solvent for pyridine hydrochloride.

In place of chlorosulfonic acid in pyridine mixtures of sulfur trioxide and pyridine, or pyrosulfuric acid and pyridine, and other sulfonating agents together with organic bases may be used together with a diluent in the preparation of sulfuric acid derivatives of cellulose according to the process of the present invention. The effective cellulose sulfonating agent is the mixture or compound of tertiary base and sulfur trioxide, chlorosulfonic acid, chlorosulfonic ester, or pyrosulfuric acid.

Pyrosulfuric acid as used in the specification and claims is contained in any one of the following mixtures of substances:

H₂SO₄+ClSO₃H which react to form fuming sulfuric acid.
Fuming sulfuric acid (any percent excess SO₃).
Fuming sulfuric acid+HCl (latter as pyridine hydrochloride).
SO₂Cl₂+H₂SO₄.
SOCl₂+H₂SO₄.

Sulfuryl and thionyl chlorides each react with sulfuric acid to form chlorosulfonic acid which in turn reacts with further sulfuric acid to form fuming sulfuric acid.

The proportions of the several components of the above mixtures may vary widely but so long as both components of the two-component mixture are present even in small amounts, pyrosulfuric acid (H₂S₂O₇ or H₂SO₄·SO₃) is also present and the advantages of this invention will be realized. The effect of varying proportions of reagents is shown in the following table:

TABLE II

Effect of proportions of reagents

| No. | Cellulose | Pyridine | Dioxane | Chlorosulfonic acid | Sulfuric acid | H₂SO₄ in product |
|---|---|---|---|---|---|---|
| | Grams | Liters | Liters | Liters | Liters | Percent |
| 1 | 0.45 | 4.38 | 2.40 | 1.00 | 0 | 31.6 |
| 2 | 0.45 | 4.38 | 2.40 | 0.91 | 0.08 | 34.6 |
| 3 | 0.45 | 4.38 | 2.40 | 0.82 | 0.15 | 34.6 |
| 4 | 0.45 | 4.38 | 2.40 | 0.73 | 0.22 | 32.1 |
| 5 | 0.45 | 4.38 | 2.40 | 0.64 | 0.30 | 16.5 |
| 6 | 0.45 | 4.38 | 2.40 | 0.55 | 0.37 | 33.9 |
| 7 | 0.45 | 4.38 | 2.40 | 0.45 | 0.45 | 17.7 |
| 8 | 0.45 | 4.38 | 2.40 | 0.36 | 0.52 | 8.8 |
| 9 | 0.45 | 4.38 | 2.40 | 0.27 | 0.60 | 1.7 |
| 10 | 0.45 | 4.38 | 2.40 | 0.18 | 0.67 | 2.2 |
| 11 | 0.45 | 4.38 | 2.40 | 0.09 | 0.75 | 2.4 |
| 12 | 0.45 | 4.38 | 2.40 | 0 | 0.82 | 3.14 |

Similarly phosphorus trichloride or fluorosulfonic acid may be used to make the corresponding derivatives of cellulose or other carbohydrates.

This invention makes it even more advantageous and practicable to use chlorosulfonic acid and pyridine, or to use sulfur trioxide and pyridine, or pyrosulfuric acid and pyridine. The materials obtained by the process may be used as thickening agents in dyestuffs pastes, as protective colloids in certain pigment suspensions, as sheet-forming materials and as intermediate products in forming other cellulose derivatives.

The salts being neutral, stable, and water soluble, may be of use as sizing materials for certain textile operations.

The process of the present invention is characterized by an ease of control in mixing of the reactants and in control of the final product. By the use of a diluent, by-product formation with consequent loss of materials used is largely prevented. Furthermore, the use of the diluent makes uniform and complete reaction possible by facilitating stirring and mixing and renders unnecessary the use of special refrigerating equipment. The process shows its advantage over the prior art in the lack of excessive degradation and in the improved quality of the product. This improved quality is, perhaps, most strikingly demonstrated in the freedom from colored and tarry by-products so often obtained in the prior art. The product obtained by the process of the present invention gives aqueous solutions of high viscosity and salts whose solubilities are controllable within rather wide limit. By the use of certain diluents, likewise the fibrous character of the cellulose may be preserved.

As many apparently widely different embodiments of this invention may be made without departing from the spirit and scope thereof, it is to be understood that I do not limit myself to the specific embodiments thereof except as defined in the appended claims.

I claim:
1. Process for preparing sulfuric acid derivatives of carbohydrates comprising reacting a material having a carbohydrate nucleus and containing esterifiable hydroxyls with a preformed esterifying mixture of a substance capable of sulfonating the carbohydrate material and containing the radical

a tertiary amine, and a diluent inert to the sulfonating substance-tertiary amine mixture and to the cellulosic substance.

2. The process for preparing sulfuric acid derivatives of cellulose comprising reacting a material having the cellulosic nucleus and containing esterifiable hydroxyls with a preformed esterifying mixture of a substance capable of sulfonating the cellulosic material and containing the radical

a teritary amine, and a diluent inert to the sulfonating substance-tertiary amine mixture and to the cellulosic substance.

3. The process for preparing sulfuric acid derivatives of cellulose comprising reacting a material having a cellulosic nucleus and containing esterifiable hydroxyls with a preformed esterifying mixture of chlorosulfonic acid, a tertiary amine, and a diluent inert to the chlorosulfonic acid tertiary amine mixture and to the cellulosic substance.

4. The process for preparing sulfuric acid derivatives of cellulose comprising reacting a material having a cellulosic nucleus and containing esterifiable hydroxyls with a preformed esterifying mixture of chlorosulfonic acid, a tertiary amine of the pyridine type, and a diluent inert to the chlorosulfonic acid-tertiary amine mixture and to the cellulosic substance.

5. The process for preparing sulfuric acid derivatives of cellulose comprising reacting cellulose with a preformed esterifying mixture of chlorosulfonic acid, a tertiary amine, and a diluent inert to the chlorosulfonic acid-tertiary amine mixture and to the cellulosic substance.

6. The process for preparing sulfuric acid derivatives of cellulose comprising reacting cellulose with a preformed esterifying mixture of chlorosulfonic acid, of a tertiary amine of the pyridine type, and a diluent inert to the chlorosulfonic acid-tertiary amine mixture and to the cellulosic substance.

7. The process for preparing sulfuric acid derivatives of cellulose comprising reacting cellulose with a preformed esterifying mixture of chlorosulfonic acid, pyridine, and a diluent inert to the chlorosulfonic-pyridine mixture and to the cellulosic substance.

8. The process for preparing sulfuric acid derivatives of cellulose comprising reacting cellulose at a temperature between 20 to 130° C. with a preformed esterifying mixture of chlorosulfonic acid, pyridine, and a diluent inert to the chlorosulfonic-pyridine mixture and to the cellulosic substance.

9. The process for preparing sulfuric acid derivatives of cellulose comprising reacting cellulose with a preformed esterifying mixture of pyrosulfuric acid, a tertiary amine of the pyridine type, and a diluent inert to the pyrosulfuric acid-tertiary amine mixture and to the cellulosic substance.

10. The process for preparing sulfuric acid derivatives of cellulose comprising reacting cellulose with a preformed esterifying mixture of pyrosulfuric acid, a tertiary amine, and a diluent inert to the pyrosulfuric acid-tertiary amine mixture and to the cellulosic substance.

11. The process for preparing sulfuric acid derivatives of cellulose comprising reacting cellulose with a preformed esterifying mixture of sulfur trioxide, of a tertiary amine, and a diluent inert to the sulfur trioxide-tertiary amine mixture and to the cellulosic substance.

12. The process for preparing sulfuric acid derivatives of cellulose comprising reacting cellulose with a preformed esterifying mixture of sulfur trioxide, a tertiary amine of the pyridine type, and a diluent inert to the sulfur trioxide-tertiary amine mixture and to the cellulosic substance.

13. Sulfuric acid derivatives of cellulose of improved color and viscosity obtainable by the process of claim 1.

GEORGE W. RIGBY.